(12) United States Patent
Devore

(10) Patent No.: US 6,526,965 B1
(45) Date of Patent: Mar. 4, 2003

(54) SOLAR ENERGY COLLECTION PANEL FOR HEATING POOLS OF WATER

(76) Inventor: Clyde W. Devore, 9810 3rd Street Rd., Louisville, KY (US) 40272

(*) Notice: Subject to any disclaimer, the term of this patent is extended or adjusted under 35 U.S.C. 154(b) by 0 days.

(21) Appl. No.: 10/086,608

(22) Filed: Mar. 1, 2002

(51) Int. Cl.⁷ .................................................. F24J 2/42
(52) U.S. Cl. ........................ 126/563; 126/621; 126/663; 126/667
(58) Field of Search ................................. 126/621–623, 126/651, 655, 663, 666–669, 704, 563; 165/170–175

(56) References Cited

U.S. PATENT DOCUMENTS

| | | |
|---|---|---|
| 1,101,001 A | 6/1914 | Willsie |
| 3,022,781 A | 2/1962 | Andrassy |
| 3,146,774 A | 9/1964 | Yellott |
| 3,215,134 A | 11/1965 | Thomason |
| 3,270,739 A | 9/1966 | Thomason |
| 3,868,945 A | 3/1975 | Konopka et al. |
| 3,991,742 A | 11/1976 | Gerber |
| 4,010,733 A | 3/1977 | Moore |
| 4,023,556 A | 5/1977 | Sarazin et al. |
| 4,031,881 A | 6/1977 | Thiel |
| 4,033,326 A | 7/1977 | Leitner |
| 4,038,970 A | 8/1977 | D'Ascoli et al. |
| 4,056,090 A | 11/1977 | Henriques et al. |
| 4,059,095 A | 11/1977 | Grundmann et al. |
| 4,062,350 A | 12/1977 | Reed |
| 4,068,652 A | 1/1978 | Worthington |
| 4,077,393 A | 3/1978 | Mattson |
| 4,080,221 A | 3/1978 | Manelas |
| 4,085,732 A | 4/1978 | Hysom |
| 4,089,324 A | 5/1978 | Tjaden |
| 4,120,286 A | 10/1978 | Farber |
| 4,121,568 A | 10/1978 | Olsen |
| 4,133,299 A * | 1/1979 | Lyon .......................... 126/666 |
| 4,143,644 A | 3/1979 | Heitland et al. |
| 4,151,830 A | 5/1979 | Crombie et al. |
| 4,154,220 A | 5/1979 | Loth |
| 4,159,709 A | 7/1979 | Palazzetti |
| 4,166,445 A | 9/1979 | McGraw |
| 4,174,703 A | 11/1979 | Blakey et al. |
| 4,178,912 A * | 12/1979 | Felter ......................... 126/621 |
| 4,178,914 A | 12/1979 | Erb |
| 4,187,901 A | 2/1980 | Coleman et al. |
| 4,190,038 A | 2/1980 | Heitland et al. |
| 4,211,213 A | 7/1980 | Nissen et al. |
| 4,221,210 A | 9/1980 | Cvijanovich |
| 4,285,335 A | 8/1981 | Simmons, Sr. et al. |
| 4,287,883 A | 9/1981 | Kyrias |
| 4,297,991 A | 11/1981 | Easton |
| 4,300,532 A | 11/1981 | Olsen |
| 4,300,534 A | 11/1981 | Bowen |
| 4,312,323 A | 1/1982 | Domenech |
| 4,323,051 A | 4/1982 | Auerbach et al. |
| 4,338,995 A | 7/1982 | Shelley |
| 4,368,726 A | 1/1983 | Ellsworth |
| 4,369,836 A | 1/1983 | Bleckmann |
| 4,381,764 A | 5/1983 | Wojeik |
| 4,409,960 A | 10/1983 | Balzer |
| 4,414,961 A | 11/1983 | Luebke |
| 4,432,346 A | 2/1984 | Westerstrandh et al. |
| 4,442,827 A | 4/1984 | Helman et al. |
| 4,473,064 A | 9/1984 | Jacques |
| 4,485,802 A | 12/1984 | Babcock |
| 4,660,545 A | 4/1987 | Ely |
| 4,674,244 A | 6/1987 | Francovitch |

(List continued on next page.)

*Primary Examiner*—James C. Yeung
(74) *Attorney, Agent, or Firm*—Middleton Reutlinger

(57) ABSTRACT

A radiant energy collection unit that can be used in a solar panel heating system is described. The energy collection unit comprises an absorbing panel secured to a base panel and forming a channel there between. The channel is in fluid communication with an inlet feeder and an outlet conduit. The design of the collection unit allows for its use on a house, garage or similar building.

16 Claims, 5 Drawing Sheets

U.S. PATENT DOCUMENTS

| | | |
|---|---|---|
| RE32,523 E | 10/1987 | Resnick et al. |
| 4,823,771 A | 4/1989 | Menning |
| 4,932,085 A | 6/1990 | Saj |
| 5,012,796 A | 5/1991 | Park |
| 5,161,611 A | 11/1992 | Sander et al. |
| 5,205,348 A | 4/1993 | Tousignant et al. |
| 5,259,363 A | 11/1993 | Peacock et al. |
| 5,275,235 A | 1/1994 | Cesaroni |
| 5,313,933 A | 5/1994 | Gocze |
| 5,388,567 A | 2/1995 | Hodak |
| 5,460,164 A | 10/1995 | Rekstad et al. |
| 5,469,915 A | 11/1995 | Cesaroni |
| 5,572,988 A | 11/1996 | Walton |
| 5,590,495 A | 1/1997 | Bressler et al. |
| 5,601,075 A | 2/1997 | Lai |
| 5,724,479 A | 3/1998 | Takahashi |
| 5,881,713 A | 3/1999 | Lai |
| 6,014,967 A | 1/2000 | Rekstad et al. |
| 6,082,354 A | 7/2000 | Rekstad |
| 6,196,216 B1 | 3/2001 | Kooij |

\* cited by examiner

SOLAR ENERGY COLLECTION PANEL FOR HEATING POOLS OF WATER

BACKGROUND

The present invention is a radiant energy collection unit that can be used in a solar panel heating system to heat a swimming pool or a similar body of water. The collection unit includes panels that resemble sheet metal roofing panels, and can be mounted on a house, building or garage positioned in close proximity to the pool.

Solar panel heating systems have been used to convert solar energy to thermal energy since the 1940's. Typically, such panels have a relatively flat, dark-colored panel for absorbing the sun's radiant energy and converting it to thermal energy, and a recirculating flow system through which a heat-transfer fluid flows. The flow system consists of a reservoir, an inlet pipe, a plurality of heat-transfer tubes, and an outlet pipe. The fluid is transferred from the reservoir into the inlet pipe. The inlet pipe is in fluid communication with the heat-transfer tubes that are mounted relative to the dark-colored panel such that heat can be transferred from the panel to the fluid flowing though the tubes. The heated fluid flows from the tubes into the outlet pipe and back to the reservoir. The system may further include a pump to force the fluid through the pipes and tubes of the flow system. As is known in the art, various heat transfer devices may be included in the flow system between the heat-transfer tubes and the reservoir to utilize the converted radiant energy, or the energy may be allowed to dissipate to the surrounding environment. The materials of construction can affect the performance of the solar panels. For example, plastic solar panels are less efficient than metal panels for heat transfer because of the low conductivity of the plastic.

Although the use of solar panels for delivering large-scale heating may be limited, solar panels are generally viewed as efficient heating devices for swimming pools and outdoor spas. Water is an excellent heat-transfer fluid and retains heat transferred to it for an extended period of time. The pool or spa is available to serve as the reservoir, and there is usually a pump and water recirculating system associated with the pool to filter the pool water. However, most systems which have been designed to date either require expensive materials, such as copper tubing or copper coated panels, or are inconvenient to use because the systems must be spread over large sections of the user's yard to access the solar energy.

SUMMARY OF THE PRESENT INVENTION

The present invention is a radiant energy collection unit that can be used in a solar panel heating system to heat a swimming pool or a similar body of water. The energy collection unit comprises a pair of sheet metal roofing panels secured together and adapted to receive water from a feeder. The collection unit can be included as part of a solar panel heating system that further includes a swimming pool reservoir, an inlet piping system which has an in-line pump for transferring water from the reservoir to the collecting panel unit, and an outlet piping system. Because of its physical appearance and materials of construction, the energy collection unit can be mounted on a roof of a house, garage, shed or similar building positioned in relatively close proximity to the pool.

DESCRIPTION OF THE PREFERRED EMBODIMENT

Figure 1:
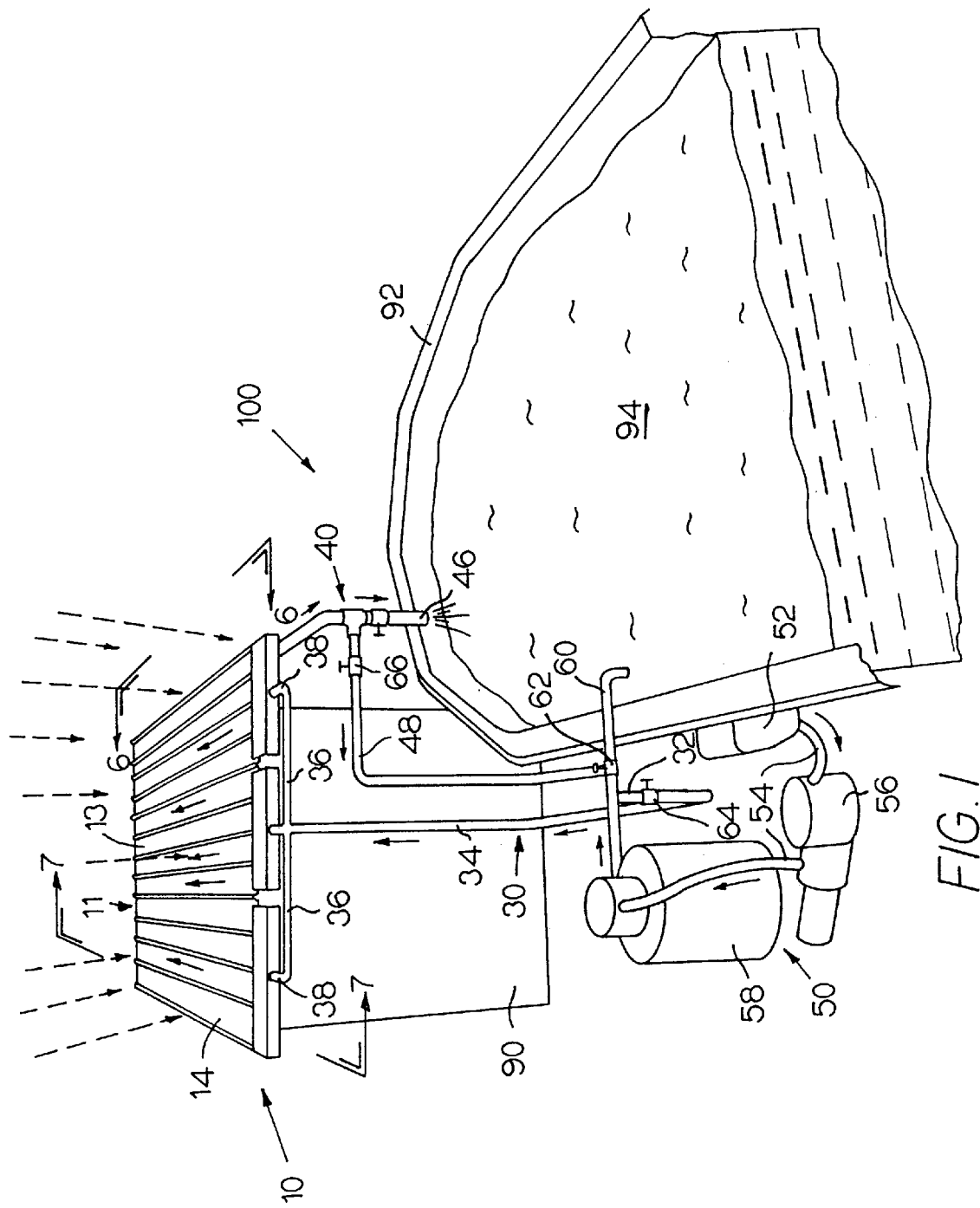
FIG. 1 is a perspective view of a solar panel heating system including three radiant energy collection units made in accordance with the present invention and mounted on a building neighboring a swimming pool reservoir.
Figure 2:
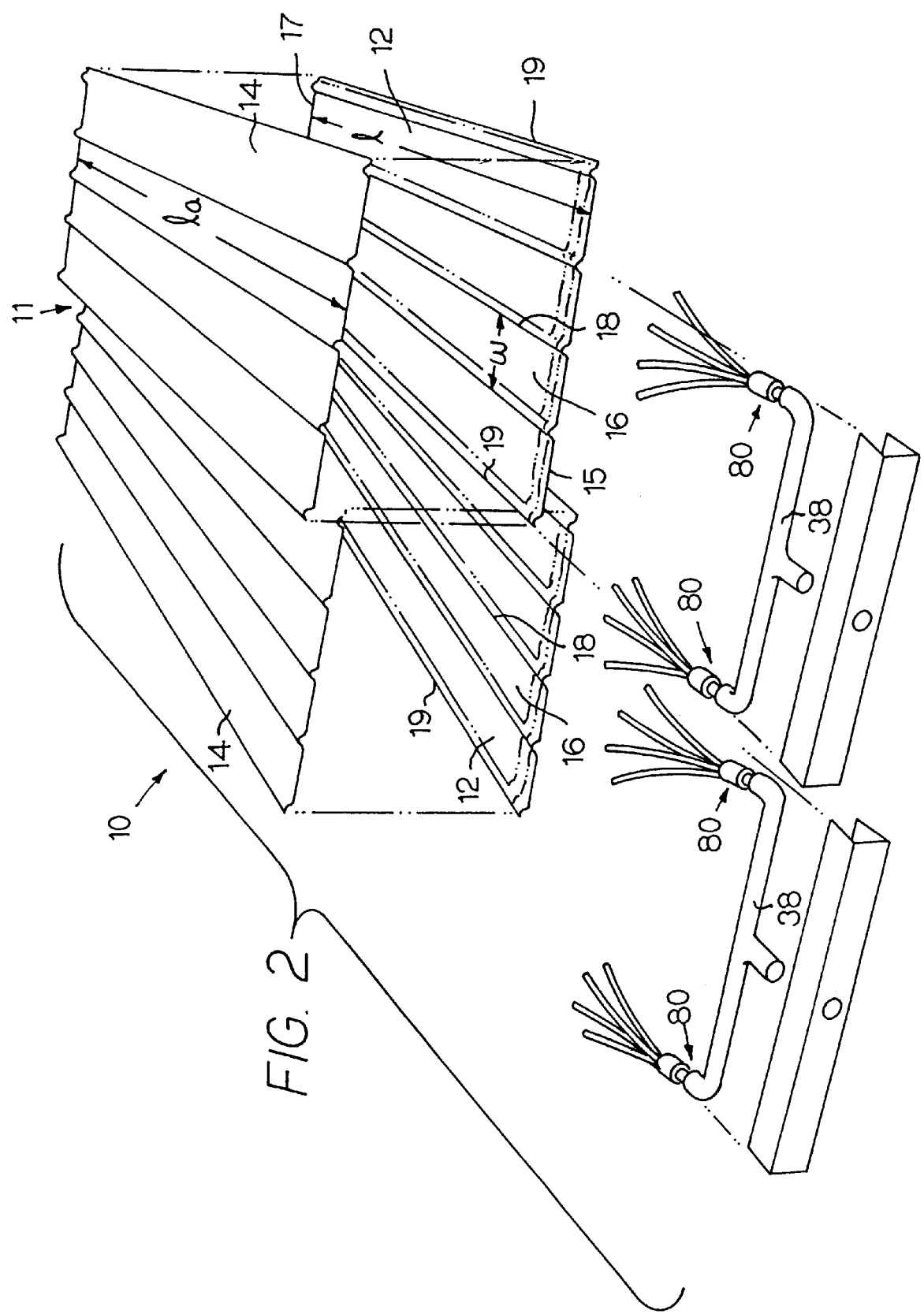
FIG. 2 is a perspective view of part of the radiant energy collection unit of FIG. 1, and absent sealing material.

The present invention is a radiant energy collection unit that can be used in a solar panel heating system to heat a swimming pool or a similar body of water. FIG. 1 shows a typical example of a solar panel heating system 100 incorporating a radiant energy collection unit 10. The collection unit 10 is mounted in a relatively open area—an area having few trees or similar shading elements—in relatively close proximity to a reservoir 92. In the embodiment shown in FIG. 1, the reservoir 92 is an above-ground swimming pool and the collection unit 10 is mounted on a roof of a house, shed, garage or similar building 90. An inlet piping system 30 allows the pool 92 to be in fluid communication with the collection unit 10. Water 94 circulated from the pool 92 to the collection unit 10 can be returned to the pool 92 through an outlet piping system 40.

As shown in FIGS. 1–7, the radiant energy collection unit 10 includes a heating panel unit 11 and at least one feeder 80. The heating panel unit 11 comprises a base panel 12, having a length "l", and an absorbing panel 14, having a length "$l_a$." The panels 12, 14 are secured together with sealing material 20, and a channel 24 that essentially runs the length "l" of the base panel 12 is formed between the panels 12, 14. The base panel 12 and the absorbing panel 14 are made of relatively high heat conducting materials, such as aluminum, aluminum alloys, or similar conducting materials. For example, the base panel 12 may be a piece of semi-rigid material, such as sheet metal roofing, having a plurality of essentially flat longitudinal spans 16 separated by longitudinal ribs 18—i.e., the spans 16 and ribs 18 run parallel to the length "l" of the panel 12. The ribs 18 also define a width "w" as the distance between essentially equal points on a neighboring pair of ribs 18. The panel 12 further defines an inlet edge 15, an outlet edge 17 and a pair of side edges 19. The absorbing panel 14 is essentially identical to the base panel 12 except that the absorbing panel 14 has the length "$l_a$" which is slightly longer than the base panel length "l". In an embodiment such as shown in FIGS. 1–7, the base panel 12 and absorbing panel 14 are prepared from commercially available metal roofing sheets. The dimensions of the flat spans and the ribs can vary, but a typical sheet has an overall width of about 38 inches, a length of up to 40 feet, ribs about 1.75 inches wide and about 0.75 inches high, and flat spans about 7.25 inches wide. Optionally, the flat spans may have slight rippling to add strength to the sheet.

A sealing material 20, such as a polyurethane adhesive, is used to secure the base panel 12 to the absorbing panel 14. The sealing material 20 is applied in longitudinal strips 22

Figure 3:
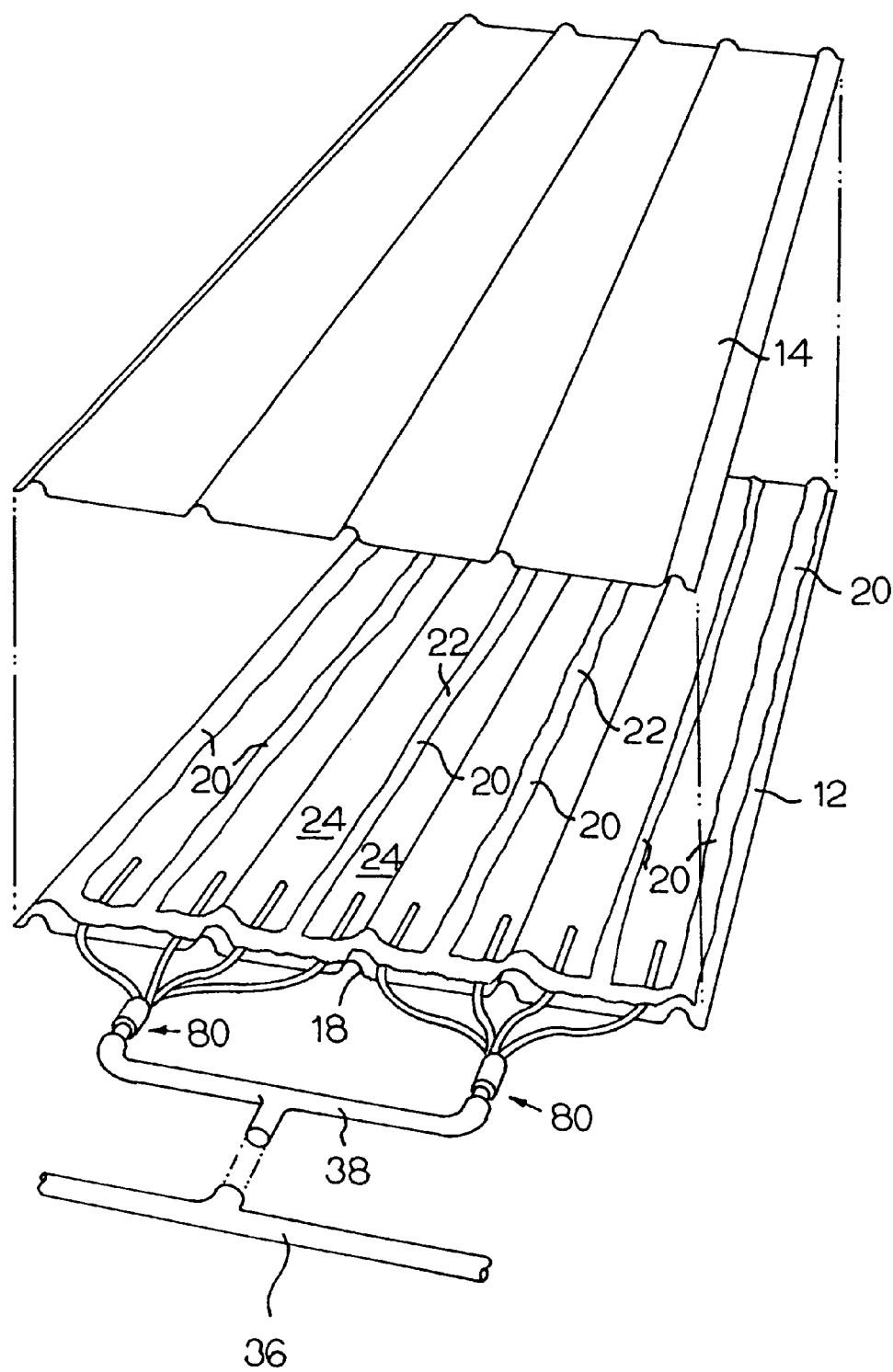
FIG. 3 is a view of one section of the radiant energy collection unit of FIG. 1 with an absorbing panel removed to expose sealing material deposited on the metal base panel and a pair of feeders secured to a metal base panel with the sealing material.

(running parallel to the length "l" of the panel 12) at varying intervals across the panel 12. The absorbing panel 14 is positioned on the base panel 12 in parallel relationship and is secured to the base panel 12 along the sealing strips 22. In the embodiment shown in FIGS. 1–7, the strips 22 are applied so as to lie about midway between adjacent ribs 18 or between a rib 18 and an edge 19, as shown in FIG. 3, thereby creating essentially parallel channels 24. In the areas where the adhesive is present, the panels 12, 14 are separated from one another by the thickness of the adhesive or by a distance of not more than about 20 mils. In the areas where the adhesive is absent, the panels 12, 14 may be in physical contact. Adhesive 20 is also applied adjacent to the edges 19.

Figure 4:
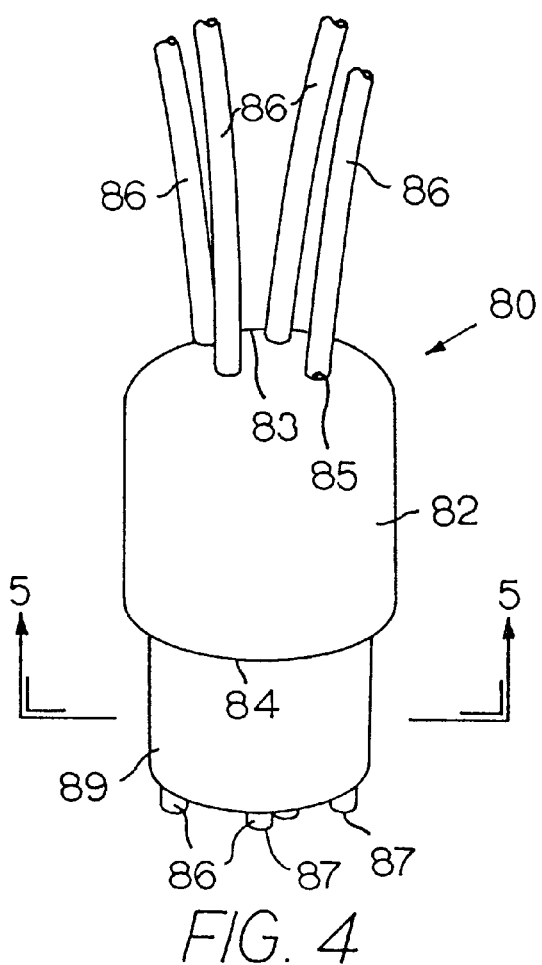
FIG. 4 is a side view of the feeder of FIG. 3.
Figure 5:
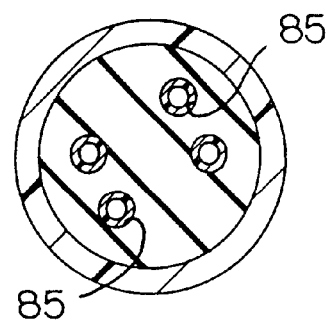
FIG. 5 is an outlet view of the feeder of FIG. 4.

The feeder 80 is a means for introducing water between the panels 12, 14. As shown in FIGS. 4 and 5, the feeder 80 includes a nozzle 82 and a plurality of feeder tubes 86. The nozzle 82 has a head 83 and a tail 84. The head 83 includes a plurality of apertures 85 through which the feeder tubes 86 can project. The tail 84 is adapted to securely attach to an inlet branch 38, which is part of the inlet piping system. Optionally, an adapter 89 may be included between the tail 84 and the inlet branch 38 to ensure a tighter fit between the various components.

As shown in FIGS. 2–5, the feeder tubes 86 are relatively narrow tubes which have a first end 87 that projects into the inlet branch 38 and a second end which is secured between the base and absorber panels 12, 14. The tubes 86 are secured in the nozzle 82, and if present in the adapter 89, with adhesive such that at least about 2 inches of tube 86 extends from the head 83 of the nozzle 82. The first ends 87 of the tubes extend from the head 83 of the nozzle and are secured to the base panel 12 near the inlet edge 15 with adhesive 20, with at least about 3 inches of tube 86 extending over the panel 12. In a preferred embodiment, the adhesive covers about 2 inches of tubing from the inlet edge 15. The tubes 86 are preferably positioned along the flat spans 16 of the base panel 12 such that one tube 86 feeds each channel 24. On a panel 12 having a span of about 7 inches, there are preferably about 2 tubes 86 per span 16. Although the number of tubes per nozzle can vary, for a branch 38 having a diameter of about 1 inch, it is recommended that each nozzle 82 support about four tubes 86.

Figure 6:
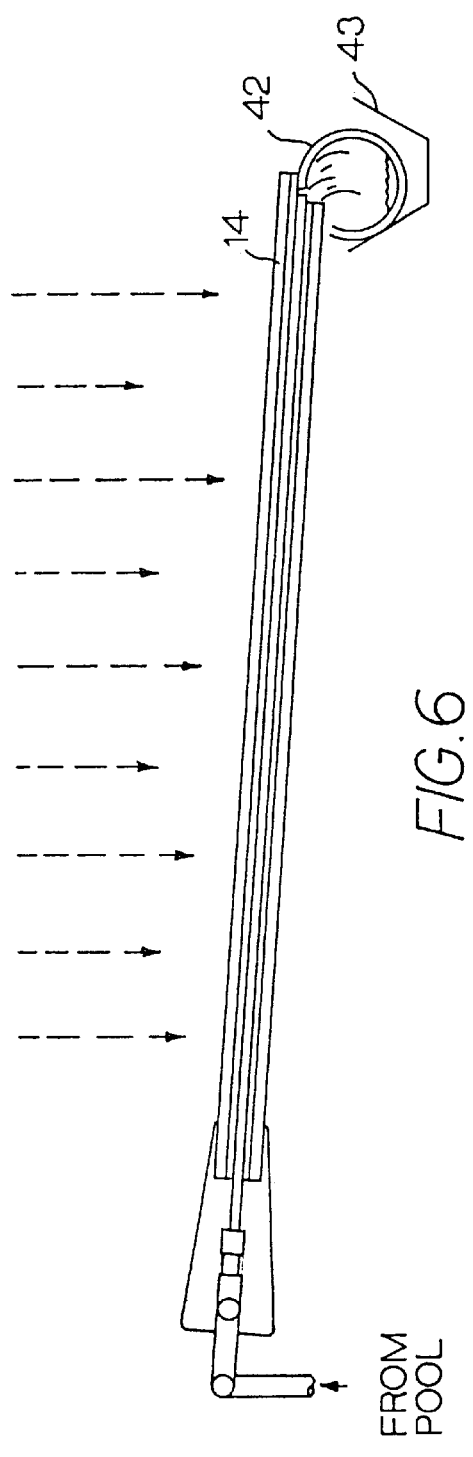
FIG. 6 is a cross-sectional view of the solar panel heating system of FIG. 1 taken along line 6—6.
Figure 7:
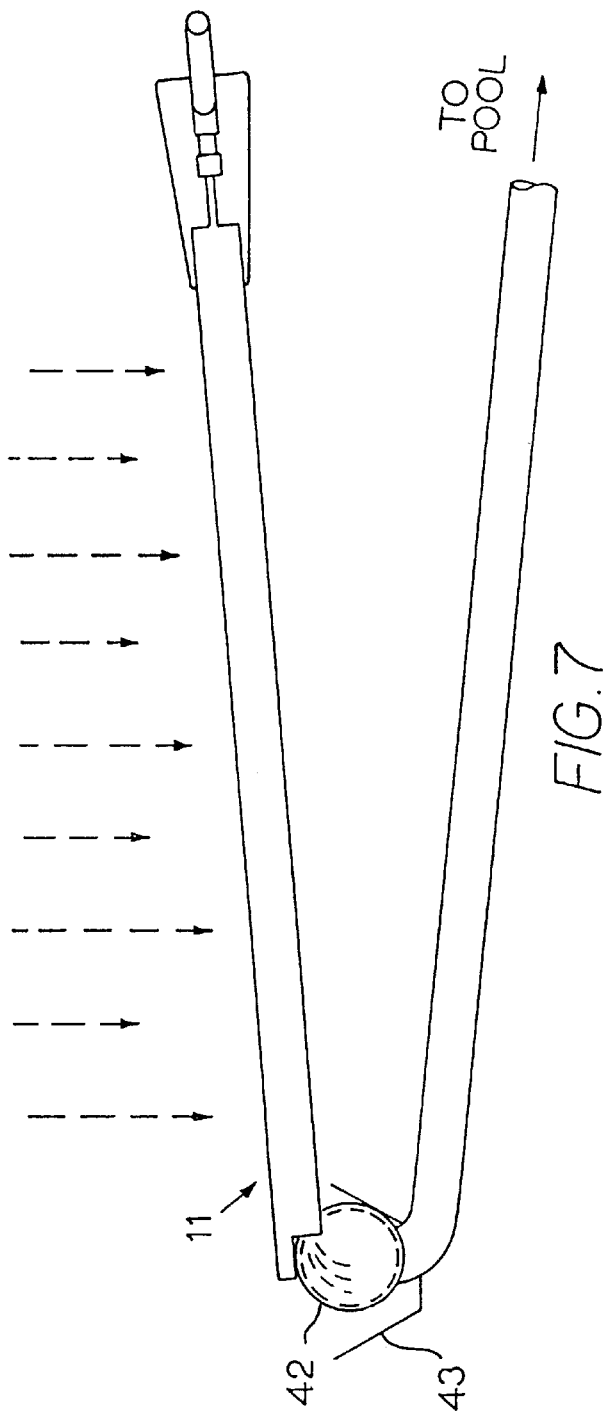
FIG. 7 is a side view of the solar panel heating system of FIG. 1 taken along line 7—7.

As shown in FIGS. 6 and 7, the absorbing panel 14 terminates at a conduit 42. Because the absorbing panel 14 extends beyond the base panel 12, the absorbing panel 14 can effectively cover the conduit 42 preventing leaves and similar debris from being deposited in the conduit 42. For example, the conduit 42 is preferably affixed to the absorbing panel 14 such that the conduit 42 can receive water which passes between the panels 12, 14. However, any water that flows over the top surface of the absorbing panel 14 would be directed away from the conduit 42. For example, in the embodiment shown in the Figures, the conduit 42 fits within a standard gutter 43 and a small gap is formed between the absorbing pane 14 and the gutter. Water flowing through the solar heat collection unit 10 exits from between the panels 12, 14 into the conduit 42, but rain water flowing along the top surface of the absorbing panel 14 is directed into the gutter 43.

The water 94 is routed to the radiant energy collector unit 10 through the inlet piping system 30, and is returned to the pool 92 by the outlet piping system 40. Referring again to FIG. 1, the inlet piping system 30 includes one or more pipes which can transfer water 94 from the pool 92 to the collection unit 10. In the embodiment of FIG. 1, a water recirculating system 50 for the pool 92 has been modified to include a shunt 32 which routes the water 94 through the solar panel heating system 100 rather than allowing it to return directly to the pool 92. Specifically, the recirculating system 50 includes a skimmer 52 that allows water 94 to flow through tubing 54 into a pump 56. From the pump 56, the water 94 passes through a filter 58 and can be fed back into the pool 92 though an exit tube 60. Alternatively, a series of valves 62, 64 can be adjusted so that the water 94 is prohibited from entering the exit tube 60. Instead, the water 94 is routed through the inlet piping system 30 by passing through the shunt 32, into a mass transfer line 34 and then into one or more branches 36 and inlet branches 38 that terminate at the collection unit 10. At the collector unit 10, the water 94 encounters the feeder 80 and must pass through the feeder tubes 86 to enter between the base panel 12 and the absorber panel 14. As shown in FIG. 6, with the absorber panel 14 secured to the base panel 12 and the tubes 86 secured between the panels 12, 14, water 94 can flow from the inlet piping system 30 and along the flat spans 16 between the panels 12, 14. With the sun's rays beating down on the absorber panel 14, the panel 14 is heated and can transfer the heat through the panel 14 and into the water 94. The heated water 94 exits from the panels 12, 14 into the outlet piping system 40, and can be fed directly back into the pool 92 through a first exit port 46 or can be fed through a second exit port 48 back to the exit tube 60. One or more valves 66 can optionally be included to control the flow path. Specifically, as shown in FIGS. 6 and 7, the water 94 exits into a conduit 42 and then into one or more pipes 44 which carry the heated water 94 back into the pool 92.

As is known in the art, aluminum and iron are easily corroded by treated swimming pool water. Thus, the materials used for construction of the radiant energy collection unit are preferably sufficiently durable to withstand extended exposure to chlorinated water. For example, sheet metal roofing sheets coated with Fluorothane II® or a similar urethane/fluoro-polymer can reduce the rate of corrosion of the panels.

Optionally, a plurality of collection panels 10 may be combined to form a roof-like structure. For example, in the embodiment shown in FIGS. 1–7, three units 10 are combined and are fed through a multiplicity of inlet branches 38. If multiple panels 10 are combined, they may be secured together with sealing material by overlapping the side edges 19.

From a reading of the above, one with ordinary skill in the art should be able to devise variations to the inventive features. For example, the ribs on the panels may have cross-sections that differ from the single hump shown, and the flat spans may include slight waves or texturing. These and other variations are believed to fall within the spirit and scope of the attached claims.

What is claimed is:

1. A radiant energy collection unit for a solar panel heating system comprising:

a. a heating panel unit having at least one longitudinal channel of predetermined width, said channel being formed between a base panel secured to an absorbing panel, and the width of said channel being defined by a pair of longitudinal ribs;

b. at least one feeder, comprising:

i. a nozzle, defining a head and a tail, said head having at least one aperture; and ii. at least one feeder tube, having a first end and a second end, said tube extending through said nozzle aperture and said first end being secured between said base panel and said absorbing panel such that said feeder tube is in liquid communication with said channel; and, c. wherein said base panel and said absorbing panel are each made of a heat conducting material and each said panel has ribs in mating relation, said panels being secured together with a sealing material which extends along an outer periphery of said base panel and said absorbing panel;

d. said sealing material applied between said base panel and said absorbing panel in longitudinal strips between said ribs.

2. The collection unit of claim 1 wherein said feeder tube extends at least about 2 inches from said head of said nozzle.

3. The collection unit of claim 1 wherein said feeder tube extends into said channel at least about 3 inches.

4. The collection unit of claim 1 wherein said sealing material is a polyurethane adhesive.

5. The collection unit of claim 1 further comprising a conduit secured to said absorbing panel such that said conduit is in fluid communication with said heating panel unit longitudinal channel.

6. A radiant energy collection unit for a solar panel heating system comprising:

a. a base panel, defining a length, an inlet edge, an outlet edge and a pair of side edges, said base panel having a plurality of essentially flat longitudinal spans separated by longitudinal ribs;

b. an absorbing panel, defining a length, an inlet edge, an outlet edge and a pair of side edges, said absorbing panel having a plurality of essentially flat longitudinal spans separated by longitudinal ribs;

c. a sealing material applied in longitudinal strips at varying intervals across said base panel, said sealing material securing said absorbing panel to said base panel in parallel relationship;

d. at least one feeder, comprising:
   i. a nozzle, defining a head and a tail, said head having at least one aperture; and,
   ii. at least one feeder tube, having a first end and a second end, said tube extending through said nozzle aperture and said first end being secured between said base panel and said absorbing panel adjacent said inlet edge;

e. wherein said sealing material is applied between said base panel and said absorbing panel along an outer periphery of said panels and in longitudinal strips essentially midway between said ribs forming a plurality of essentially parallel channels.

7. The collection unit of claim 6 wherein said feeder tube extends at least about 2 inches from said head of said nozzle.

8. The collection unit of claim 6 wherein said feeder tube protrudes between said base panel and said absorbing panel and is positioned along said flat spans.

9. The collection unit of claim 8 wherein said tube extends between said panels at least about 3 inches from said inlet edge.

10. The collection unit of claim 6 wherein said sealing material is a polyurethane adhesive.

11. The collection unit of claim 6 further comprising a conduit secured to said absorbing panel such that said conduit is in fluid communication with said channels.

12. A method of making a radiant energy collection unit comprising the steps of:

a. providing a base panel, having an inlet edge and a plurality of essentially flat longitudinal spans separated by longitudinal ribs;

b. applying a sealing material in longitudinal strips at varying intervals across said base panel;

c. securing an absorbing panel having a plurality of essentially flat longitudinal spans separated by longitudinal ribs to said base panel in parallel relationship;

d. providing at least one feeder, comprising:
   i. a nozzle, defining a head and a tail, said head having at least one aperture; and
   ii. at least one feeder tube, having a first end and a second end, said tube extending through said nozzle aperture such that said first end protrudes from said nozzle head and said second end protrudes from said nozzle tail; and e. inserting said feeder tube first end between said base panel and said absorbing panel near said inlet edge and securing said feeder tube between said panels;

f. wherein said sealing material is applied along a pair of side edges of said base panel and in essentially longitudinal strips between said longitudinal ribs.

13. The method of claim 12 wherein said feeder tube extends at least about 2 inches from said head of said nozzle.

14. The method of claim 12 wherein said feeder tube first end is inserted between said panels at least about 3 inches from said inlet edge.

15. The method of claim 12 wherein said sealing material is a polyurethane adhesive.

16. The method of claim 12 further comprising the step of securing a conduit to a terminal end of said absorbing panel.

\* \* \* \* \*